United States Patent [19]

Boyd

[11] 4,300,156

[45] Nov. 10, 1981

[54] PROJECTION TELEVISION RECEIVER HAVING DICHROIC MIRRORS AND A PROJECTING LENS WITH THREE DIFFERENT FOCAL POINTS

[75] Inventor: Kenneth L. Boyd, Stow, Mass.

[73] Assignee: The Magnavox Company, New York, N.Y.

[21] Appl. No.: 40,811

[22] Filed: May 21, 1979

Related U.S. Application Data

[63] Continuation of Ser. No. 789,749, Apr. 21, 1977, abandoned.

[51] Int. Cl.³ .............................................. H04N 9/16
[52] U.S. Cl. .................................................. 358/64
[58] Field of Search ................... 358/60, 64, 789, 749

[56] References Cited

U.S. PATENT DOCUMENTS

| | | | |
|---|---|---|---|
| 2,586,558 | 2/1952 | Oakhill | 358/64 X |
| 2,855,457 | 10/1958 | Loughren | 358/64 X |
| 2,953,635 | 9/1960 | De Gier | 358/64 X |
| 3,969,648 | 7/1976 | Hergenrother et al. | 358/64 X |
| 4,051,513 | 9/1977 | Takeuchi et al. | 358/64 X |

OTHER PUBLICATIONS

*Theory and Design of Television Receivers*; Deutsch, McGraw-Hill Book Co., First Edition, Copyright 1951, sections 11-9 through 11-13.

*Primary Examiner*—Aristotelis M. Psitos
*Attorney, Agent, or Firm*—Thomas A. Briody; Robert T. Mayer

[57] ABSTRACT

Apparatus is provided for projecting a television image to a distant screen using a lens which is not color corrected. Three separate images of different primary colors are produced by three kinescopes. The images are directed by a set of dichroic mirrors to a projection lens. A single image is thereafter projected by the lens to a distant screen. Color correction of the optics is achieved by altering the relative position of the kinescopes with respect to the dichroic mirror assembly and altering the magnitude of deflection signals supplied to each kinescope.

2 Claims, 1 Drawing Figure

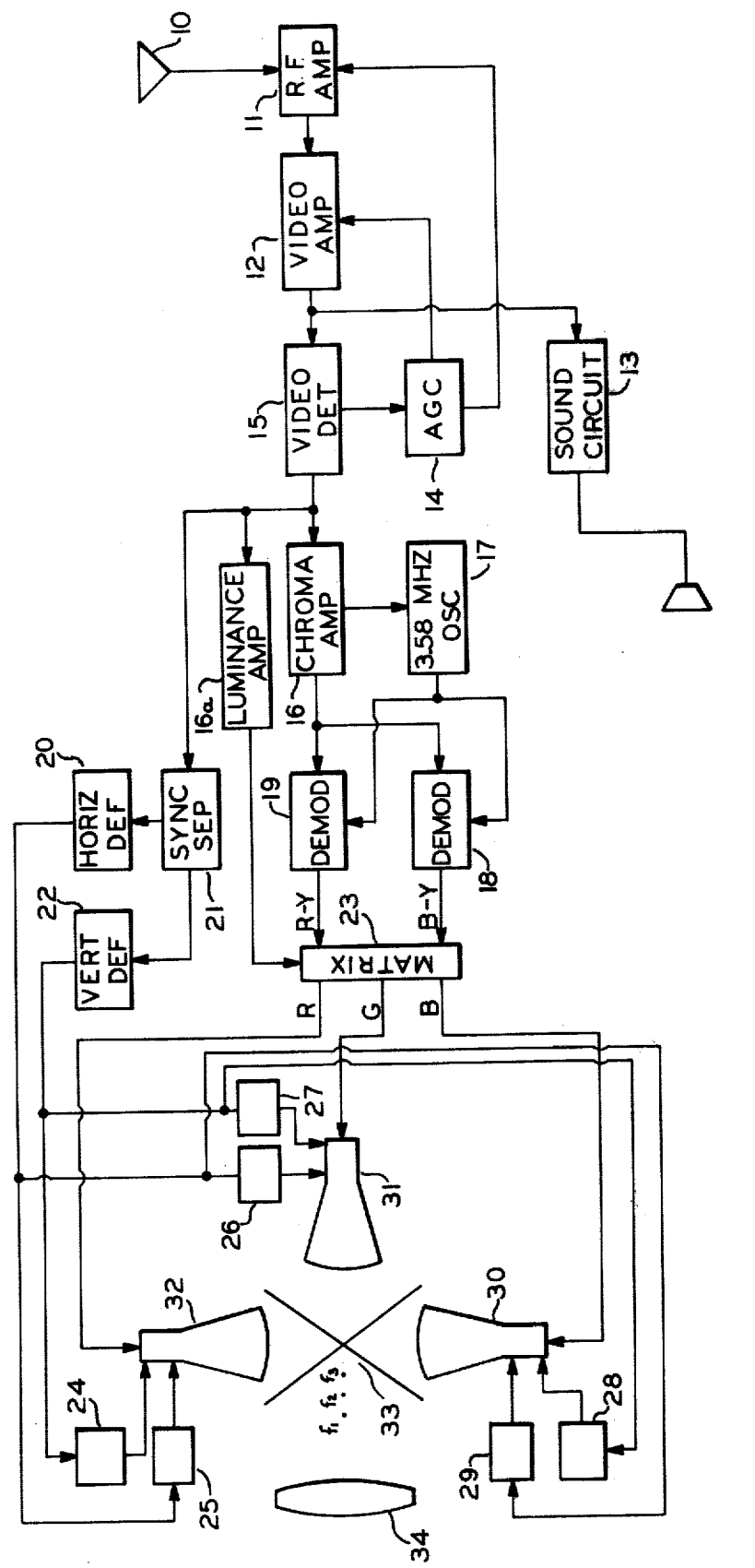

PROJECTION TELEVISION RECEIVER HAVING DICHROIC MIRRORS AND A PROJECTING LENS WITH THREE DIFFERENT FOCAL POINTS

This is a continuation of application Ser. No. 789,749, filed Apr. 21, 1977, now abandoned.

BACKGROUND OF THE INVENTION

This invention relates to the projection television receiver art. Specifically, apparatus is provided for projecting a TV image derived from three kinescopes to an exterior screen.

Projection television receivers are old in the art. It has been known that color projection television receivers may be manufactured by using three separate kinescopes. Each kinescope is used to project an image comprised of one of the primary colors to a set of crossed dichroic mirrors. The kinescope images are transmitted through the dichroic mirrors and combined at a common point. The image thus located may be magnified and transmitted to a distant screen by use of a lens.

In the past, the lens used for transmitting and magnifying the recombined image has been color corrected. The color correction is required because light of different wave lengths will be magnified to different degrees since the focus of a lens is different for different wave lengths of light. The color correction techniques employed in many lenses are expensive and do not always provide the degree of compensation necessary. The excessive cost of color correcting a lens for projecting the television image reduces the commercial market for projection TV receivers.

Therefore, a projection TV system which would not require a color corrected lens for projecting a resulting image produced by the dichroic mirrors would be desirable.

SUMMARY OF THE INVENTION

It is therefore an object of this invention to provide a color television projection system which does not require a color corrected projection lens.

In accordance with the invention, a projection television receiver is provided using a projection lens which is not color corrected. The lens exhibits separate focal points for red, green and blue light. A set of crossed dichroic mirrors transmits red, green and blue images generated by three separate kinescopes along an axis of the projecting lens to the proper focus. The location of each of the transmitted images with respect to the projecting lens is controlled so that a composite image is projected to a distant screen.

Each kinescope generates an image by forming a series of horizontal raster lines in sequence. Each raster contributtes detail to the image. The location of each raster which serves as an object to be transmitted by the mirror-kinescope assembly is altered by changing the axial distance between each kinescope and the dichroic mirror assembly. By changing these distances, the location of the image transmitted by the kinescope-dichroic mirror assembly with respect to the projecting lens is controlled. The relative position of each kinescope will locate the corresponding red, green and blue images at the proper focal point of the projection lens.

When the three images produced by the dichroic mirrors are properly located with respect to the lens, the three images will be projected by the lens to a common plane without chromatic distortion. The magnification of the images projected from the different focal points will, however, be different. To compensate for differences in the projected image sizes, the magnitude of the vertical and horizontal deflection signals applied to the kinescopes is altered which changes the raster size of the corresponding kinescope. A more complete understanding of the invention may be had with reference to the FIGURE and the description of the preferred embodiment.

DESCRIPTION OF THE DRAWING

FIG. 1 illustrates an embodiment of the projection television receiving system of this invention incorporated with a standard television receiver chassis.

DESCRIPTION OF THE PREFERRED EMBODIMENT

Referring now to FIG. 1, an embodiment of this invention is shown incorporated in a standard television receiver. FIG. 1, illustrates receiver circuitry common to the projection television of this invention and common to television receivers using a single CRT display.

An RF amplifier 11 receives broadcast signals from an antenna 10 and amplifies and preselects received signals according to the tuning of the RF amplifier. Signals which are tuned and amplified are thereafter down converted to an intermediate frequency (IF) signal. The IF signal containing the picture, sound and synchronization information is thereafter supplied to a video amplifier 12. Video amplifier 12 supplies gain to the IF signal before being supplied to video detection circuitry 15 and sound circuitry 13. The gain of the video amplifier and RF amplifier is controlled by AGC voltages indicative of the level of video signal detected with the video detector 15. AGC voltage detector 14 supplies a voltage to an RF amplifier 11 and to a video amplifier 12. The video detector 15 output contains the synchronization signals, the luminance signal, and chroma signals for generating a picture on a CRT. The luminance signal is removed from the composite video by luminance amplifier 16a. Luminance amplifier 16a supplies the luminance signal to the color matrix 23.

Chroma signal is derived from the composite video signal by a chroma amplifier 16. Chroma amplifier 16 supplies both a burst signal and a chroma signal. The burst signal enters 3.58 megacycle oscillator 17 for establishing the phase of the output signal supplied by 3.58 megacycle oscillator 17. The oscillator 17 output signal, having been phase locked to the burst signal, is supplied to demodulators 18 and 19. The demodulators 18 and 19 also receive the detected chroma signal. Demodulators 18 and 19 demodulate the detected chroma signals to provide the well-known R-Y and B-Y signals. These signals enter a matrix 23 where they are combined with the luminance signal to derive red, green, and blue signals for driving the color inputs of a kinescope.

The aforementioned circuitry is well-known and included in most color television receivers today. Also shown in the FIGURE are the vertical deflection and horizontal deflection circuitry which provide the raster scan for a kinescope. Vertical deflection circuit 22, horizontal deflection circuitry 20, and the sync separation circuitry 21 found in most color television receivers supply signals for producing the raster scan on conventional kinescopes.

The deflection signals supplied by vertical deflection circuit 22, horizontal deflection circuitry 20, and the color signal supplied by matrix 23 drive three kinescopes 30, 31 and 32. Each kinescope provides an image of one color of red, green or blue. The color images are combined by the use of two crossed dichroic mirrors 33. The image incident on the mirrors from kinescopes 30, 31 and 32 are transmitted towards a front lens 34. The front lens 34 projects the images transmitted by the dichroic mirrors to a screen.

In the past, projection systems of this type have used a color corrected lens to project the images transmitted by the dichroic mirrors. The color correction has been necessary because the different wave lengths of light produced by the respective kinescopes cause the magnification and focal length of the lens to be different for each wave length of light. Practically speaking, this results in each image formed by each kinescope being focused at different planes.

The present invention does not require the use of a color-correcting lens, and a focused multicolor image may be produced with a minimum of distortion in the following manner.

Each of the aforementioned kinescopes 30, 31 and 32 has a phosphor for producing a single colored image. The images formed by the kinescopes are combined by a set of crossed dichroic mirrors 33 in a known manner. The images are transmitted along a line coincident with the axis of a projecting lens 34. The projecting lens 34 is not color corrected and exhibits three separate focal points, $f_1$, $f_2$, and $f_3$ for the three primary colors, red, green and blue. Each image transmitted by the dichroic mirrors 34 may be located at the proper focal point of the projecting lens by changing the distance between each kinescope and the crossed dichroic mirrors.

The different focal lengths exhibited by the lens 34 produces differences of magnification of the images located at the different focal points. To compensate for differences in magnification, the size of the images produced by the kinescopes may be changed. Attenuators 24-29 are located in the vertical and horizontal deflection circuits of each kinescope. When the drive to the kinescopes is reduced by increasing the attenuation level, the image size is reduced.

The lens used in the embodiment shown, has an aperature of T/1.1 where the T number known to those skilled in the art is defined as:

$$(F \text{ No.}) / \sqrt{\text{Transmission}}$$

The back focal length of the lens must be large enough to allow the crossed dichroic mirrors to be placed in the back of the lens. Vignetting of the lens should be kept to a level to permit about 70% illumination at the corners of the defined image plane for a uniform brightness over the defined object plane. In the embodiment constructed, the resolution of one line of a 525 line TV scan was desired. This corresponds to a spot size resolution for the lens of about 5 mils. The lens should further be designed for minimum internal scattering in order to preserve the contrast ratio of the projected image.

With these lens parameters in mind, a lens suitable for use in the embodiment may be constructed by those skilled in the optical lens art.

Thus, there has been described with respect to one embodiment a projection television receiver having a noncolor-corrected lens for projecting an image. Other embodiments described by the claims that follow will be obvious to those skilled in the art.

The system described will project the three color images to be in registry and in focus at a distant screen.

What is claimed is:

1. A color projection television receiver comprising:
    (a) signal processing circuits for deriving R, G and B signals for modulating a plurality of kinescopes;
    (b) a plurality of kinescopes comprising a first kinescope for producing a substantially red image, a second kinescope for producing a substantially blue image and a third kinescope for producing a substantially green image, said kinescopes being modulated by said R, G and B signals;
    (c) deflection means for scanning electron beams produced by said plurality of kinescopes;
    (d) dichroic mirrors for directing images produced by said plurality of kinescopes along the axis of a projecting lens, each of said images being located at a position determined by the spacing of each kinescope with respect to said dichroic mirrors;
    (e) a projection lens for transmitting images produced by said dichroic mirrors to a distant screen, said lens having a first focal point for red light, a second focal point for blue light and a third focal point for green light along an axis of said lens, said focal points being separated from each other along said axis;
    (f) said kinescopes being positioned with respect to said dichroic mirrors whereby said red image is positioned at said first focal point, said blue image is positioned at said second focal point and said green image is positioned at said third focal point; and
    (g) means for altering the respective size of said images produced by said kinescopes whereby differences in magnification of said projection lens for different wave lengths of light are compensated.

2. The apparatus of claim 1 wherein said means for altering the respective size of said images produced by said kinescopes comprises attenuator means for changing the magnitude of the horizontal and vertical deflection signals associated with each kinescope.

* * * * *